US012615143B2

(12) United States Patent
Sun et al.

(10) Patent No.:  US 12,615,143 B2
(45) Date of Patent:      Apr. 28, 2026

(54) PRIVACY PRESERVING MACHINE LEARNING LABELLING

(71) Applicant: Google LLC, Mountain View, CA (US)

(72) Inventors: Yunting Sun, Jersey City, NJ (US);
Marcel M. Moti Yung, New York, NY (US); Gang Wang, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 833 days.

(21) Appl. No.: 17/795,131

(22) PCT Filed: Dec. 17, 2021

(86) PCT No.: PCT/US2021/063964
§ 371 (c)(1),
(2) Date: Jul. 25, 2022

(87) PCT Pub. No.: WO2022/150171
PCT Pub. Date: Jul. 14, 2022

(65) Prior Publication Data
US 2023/0078704 A1      Mar. 16, 2023

(30) Foreign Application Priority Data

Jan. 10, 2021    (IL) ........................................ 280057

(51) Int. Cl.
*H04L 9/08*          (2006.01)
*G06N 20/00*          (2019.01)

(52) U.S. Cl.
CPC ............. *H04L 9/088* (2013.01); *G06N 20/00* (2019.01)

(58) Field of Classification Search
CPC ............. G06F 21/6245; G06F 21/6254; G06F 21/6227; G06N 3/098; G06N 20/00;
(Continued)

(56) References Cited

U.S. PATENT DOCUMENTS

| 11,003,718 B2 * | 5/2021 | McLean | .................. | H04L 63/20 |
| 11,245,536 B2 * | 2/2022 | Knox | .................... | H04L 9/3247 |

(Continued)

FOREIGN PATENT DOCUMENTS

| CN | 102999560 | 3/2013 |
| CN | 104054075 | 9/2014 |

(Continued)

OTHER PUBLICATIONS

Office Action in Japanese Appln. No. 2024-039971, mailed on Jul. 22, 2025, 6 pages (with English translation).

(Continued)

*Primary Examiner* — Olugbenga O Idowu
(74) *Attorney, Agent, or Firm* — Fish & Richardson P.C.

(57) ABSTRACT

Methods, systems, and apparatus, including computer programs encoded on a computer storage medium, for identifying labels for a dataset without revealing the dataset to any individual computing system. Methods can include receiving, by a first computing system of a multi-party computation (MPC) system, a query that includes a first and second share of a given user profile. The second share is encrypted with a key that prevents the first computing system from accessing the second share. The second share is transmitted to a second computing system of the MPC system. The first and the second computing system generates a machine learning model and identifies a respective first and a second label. The first computing system receives the second label as a response from the second computing system. The first computing system responds to the query with a response that includes the first and the second label.

20 Claims, 6 Drawing Sheets

(58) Field of Classification Search
CPC ..... H04L 2209/46; H04L 9/008; H04L 9/085;
H04L 9/088
See application file for complete search history.

(56) References Cited

U.S. PATENT DOCUMENTS

| | | | |
|---|---|---|---|
| 2006/0026152 A1 | 2/2006 | Zeng et al. | |
| 2016/0283738 A1 | 9/2016 | Wang et al. | |
| 2017/0011306 A1 | 1/2017 | Kim et al. | |
| 2020/0142999 A1 | 5/2020 | Pedersen | |
| 2020/0242466 A1* | 7/2020 | Mohassel | G06N 3/048 |
| 2020/0286145 A1* | 9/2020 | Storm | G06Q 20/1235 |
| 2020/0293568 A1 | 9/2020 | Lu et al. | |
| 2020/0311307 A1* | 10/2020 | Levy | G06F 21/6245 |
| 2020/0412726 A1 | 12/2020 | Nevatia et al. | |
| 2022/0092216 A1* | 3/2022 | Mohassel | G06F 21/6245 |

FOREIGN PATENT DOCUMENTS

| | | |
|---|---|---|
| CN | 111563261 | 8/2020 |
| CN | 111563265 | 8/2020 |
| CN | 111612168 | 9/2020 |
| CN | 111738361 | 10/2020 |
| CN | 112036486 | 12/2020 |
| CN | 112088370 | 12/2020 |
| JP | 6034927 | 11/2016 |
| JP | 2020-525814 | 8/2020 |
| JP | 2020-532771 | 11/2020 |
| KR | 10-2012-0022893 | 3/2012 |
| WO | WO 2019121384 | 6/2019 |

OTHER PUBLICATIONS

Office Action in Chinese Appln. No. 202180008300.2, mailed on May 27, 2025, 12 pages (with English translation).
Office Action in Indian Appln. No. 202227034100, mailed on Mar. 3, 2025, 8 pages (with English translation).
Notice of Allowance in Japanese Appln. No. 2022-542251, mailed on Feb. 13, 2024, 6 pages (with English translation).
Office Action in Korean Appln. No. 10-2022-7023477, mailed on May 7, 2024, 11 pages (with English translation).
Mohassel et al., "SecureML: A System for Scalable Privacy-Preserving Machine Learning" 2017 IEEE symposium on security and privacy (SP). IEEE, May 2017, 19-38.
Notice of Allowance in Korean Appln. No. 10-2022-7023477, mailed on Jan. 17, 2025, 4 pages (with English translation).
Office Action in Japanese Appln. No. 2024-039971, mailed on Jan. 21, 2025, 8 pages (with English translation).
Office Action in European Appln. No. 21847826.1, mailed on Jun. 30, 2025, 6 pages.
Office Action in Israel Appln. No. 280057, mailed on Jun. 26, 2023, 3 pages.
Office Action in Japanese Appln. No. 2022-542251, mailed on Oct. 2, 2023, 16 pages (with English translation).
Ohata, "Round-Efficient Secure Two-Party Computation and Its Application to Privacy-Preserving Convolutional Neural Networks"

Computer Security Symposium 2018 Paper Collection, Japan, Information Processing Society of Japan, vol. 2018, No. 2, Oct. 15, 2018, 615-622 (with English abstract).
International Preliminary Report on Patentability in International Appln. No. PCT/US2021/063964, mailed on Jul. 20, 2023, 7 pages.
Github.com [online], "Floc" Aug. 22, 2019, retrieved on Oct. 26, 2022, retrieved from URL <https://github.com/WICG/floc>, 7 pages.
Github.com [online], "Trust Token API" Aug. 15, 2019, retrieved on Oct. 26, 2022, retrieved from URL <https://github.com/WICG/trust-token-api>, 13 pages.
International Search Report and Written Opinion in International Appln. No. PCT/US2021/063964, dated Mar. 17, 2022, 14 pages.
Kaaniche et al., "Privacy enhancing technologies for solving the privacy-personalization paradox: Taxonomy and survey." Journal of Network and Computer Applications 171, Dec. 2020, 102807, 1-32.
Lagendijk et al., "Encrypted signal processing for privacy protection: Conveying the utility of homomorphic encryption and multi-party computation." IEEE Signal Processing Magazine 30.1, Jan. 2013, 82-105.
Wikipedia.org "K-means clustering" created on May 9, 2005, retrieved on Aug. 7, 2020, retrieved from URL <https://en.wikipedia.org/w/index.php?title=K-means_clustering&oldid=971741624>, 17 pages.
Wikipedia.org [online], "Box-Muller transform" created on Jul. 6, 2002, retrieved on Jul. 1, 2020, retrieved from URL <https://en.wikipedia.org/wiki/Box%E2%80%93Muller_transform>, 6 pages.
Wikipedia.org [online], "Cholesky decomposition" created on Oct. 25, 2002, retrieved on Jul. 30, 2020, retrieved from URL <https://en.wikipedia.org/w/index.php?title=Cholesky_decomposition&oldid=970378038>, 16 pages.
Wikipedia.org [online], "Cosine similarity" created on Jan. 17, 2007, retrieved on Jul. 11, 2020, retrieved from URL <https://en.wikipedia.org/w/index.php?title=Cosine_similarity&oldid=967174338>, 6 pages.
Wikipedia.org [online], "Hamming Distance" created on Feb. 25, 2002, retrieved on Jun. 24, 2020, retrieved from URL <https://en.wikipedia.org/w/index.php?title=Hamming_distance&oldid-964295999>, 6 pages.
Wikipedia.org [online], "Independence (probability theory)" created on Mar. 9, 2001, retrieved on Aug. 6, 2020, retrieved from URL <https://en.wikipedia.org/w/index.php?title=Independence_(probability_theory)&oldid=971522570>, 6 pages.
Wikipedia.org [online], "k-nearest neighbors algorithm" created on Apr. 21, 2005, retrieved on Jul. 19, 2020, retrieved from URL <https://en.wikipedia.org/w/index.php?title=K-nearest_neighbors_algorithm&oldid=968399216>, 11 pages.
Wikipedia.org [online], "Locality-sensitive hashing" created on Jun. 6, 2007, retrieved on Jun. 21, 2020, retrieved from URL <https://en.wikipedia.org/w/index.php?title=Locality-sensitive_hashing&oldid=963662995>, 9 pages.
Wikipedia.org [online], "Multivariate normal distribution" created on Apr. 25, 2002, retrieved on Jul. 31, 2020, retrieved from URL <https://en.wikipedia.org/w/index.php?title=Multivariate_normal_distribution&oldid=970403679>, 17 pages.
Wikipedia.org [online], "Secret Sharing" created on Feb. 7, 2004, retrieved on Aug. 3, 2020, retrieved from URL <https://en.wikipedia.org/w/index.php?title=Secret_sharing&oldid=970942801>, 8 pages.
Notice of Allowance in Chinese Appln. No. 202180008300.2, mailed on Jan. 26, 2026, 7 pages (with English translation).

* cited by examiner

300

302 Generate a centroid feature vector for each cluster

304 Model each cluster using a probability distribution of the user profiles in the cluster 306 Generate a new centroid feature vector for each cluster 308 Share the new centroid feature vector

400

402 — Obtain shares of user profiles

404 — Create random projection planes

406 — Create m-dimensional vectors

408 — Use MPC to create shares of bit flipping patterns

410 — Project shares of user profiles to the random projection planes

412 — Reconstruct bit vectors

414 — Generate K-means machine learning model

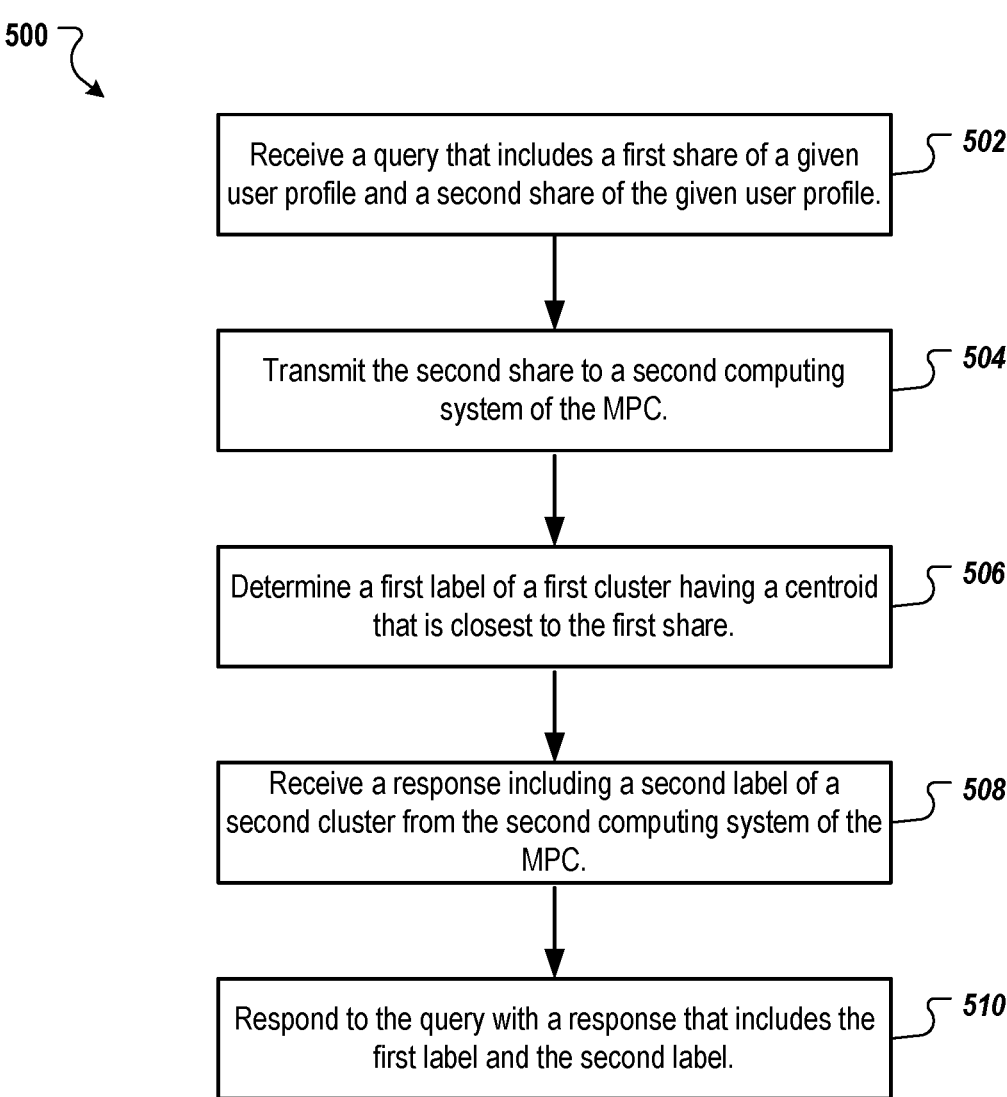

500

Receive a query that includes a first share of a given user profile and a second share of the given user profile.                502

Transmit the second share to a second computing system of the MPC.                504

Determine a first label of a first cluster having a centroid that is closest to the first share.                506

Receive a response including a second label of a second cluster from the second computing system of the MPC.                508

Respond to the query with a response that includes the first label and the second label.                510

Processor
*610*

*620* Memory

*650*

Storage Device
*630*

*640*

Input/Output

*660*

External Devices

PRIVACY PRESERVING MACHINE LEARNING LABELLING

CROSS-REFERENCE TO RELATED APPLICATION

This application is a National Stage Application under 35 U.S.C. § 371 and claims the benefit of International Application No. PCT/US2021/063964, filed Dec. 17, 2021, which claims priority to Israel Application No. 280057, filed Jan. 10, 2021, the disclosure of which is incorporated herein by reference.

BACKGROUND

This specification relates to data processing and machine learning models.

A client device can use an application (e.g., a web browser, a native application) to access a content platform (e.g., a search platform, a social media platform, or another platform that hosts or aggregates content). The content platform can display, within an application launched on the client device, digital components (a discrete unit of digital content or digital information such as, e.g., a video clip, an audio clip, a multimedia clip, an image, text, or another unit of content) that may be provided by one or more content sources that differ from the content platform.

SUMMARY

In general, one innovative aspect of the subject matter described in this specification can be embodied in methods including the operations of receiving, by a first computing system of a multi-party computation (MPC) system, a query that includes a first share of a given user profile and a second share of the given user profile, wherein the second share is encrypted with a key that prevents the first computing system from accessing the second share; transmitting, by the first computing system, the second share to a second computing system of the MPC; determining, by the first computing system, a first label of a first cluster having a centroid that is closest to the first share, wherein the first cluster is one of a plurality of clusters generated by a machine learning model trained by the first computing system and the second computing system; receiving, by the first computing system, a response including a second label of a second cluster from the second computing system of the MPC; responding to the query with a response that includes the first label and the second label.

Other implementations of this aspect include corresponding apparatus, systems, and computer programs, configured to perform the aspects of the methods, encoded on computer storage devices. These and other implementations can each optionally include one or more of the following features.

Methods can further include receiving, by the first computing system, a first plurality of partial shares of user profiles from a digital component distribution system that differs from the MPC system; receiving, by the second computing system, a second plurality of partial shares of user profiles from the digital component distribution system, wherein for an individual user, neither the first plurality of partial shares nor the second plurality of partial shares, wherein the first plurality of shares and the second plurality of shares are secret shares that includes all dimensions of the user profile of the individual user; training, by the first computing system and the second computing system, the machine learning model using the first plurality of partial shares and the second plurality of partial shares.

Methods can include training a clustering model to create multiple clusters of user profiles based on the first plurality of partial shares and the second plurality of partial shares.

Methods can include generating, by the MPC system, a centroid feature vector for each cluster from among the multiple clusters; modelling, by the MPC system, each cluster using a probability distribution of the user profiles in the cluster; generating, by the MPC system, a new centroid feature vector for each cluster based on the probability distribution and the centroid feature vector of the corresponding cluster; sharing, by the MPC computing system, the new centroid feature vectors to the digital component distribution system;

Methods can include splitting, by a client device, the given user profile into the first share and the second share; generating and transmitting, to the first computing system, the query as a request for a label of a cluster that corresponds to the given user profile; receiving, by the client device, the response that includes the first label and the second label; storing, by the client device, device final label generated based on the first label and the second label.

Methods can include generating a final label that further includes modelling, by the first and second computing system, the user profiles of the first and second clusters as a normal distributions; determining, by the first and second computing system, the parameters of the normal distributions that includes the centroid and the covariance matrix; generating, by both the first and second computing system, a first and a second share of the final label; transmitting, by the MPC system the first and the second share of the final label to the client device; reconstructing, by the client device, the final label using the first and the second share of the final label.

Methods can include determining, by the first and second computing system, the covariance matrix that includes determining, by the first and second computing system, an integer matrix such that the matrix when multiplied by its transpose generates the covariance matrix.

Particular embodiments of the subject matter described in this specification can be implemented so as to realize one or more of the following advantages. The techniques described in this document can create groups of users that have similar interests and expand user group membership while preserving the privacy of users, e.g., without the need to share users' online activity outside the browser. This restricts access to sensitive user information, protects user privacy with respect to such platforms, and preserves the security of the data that arise from breaches during transmission to or from the platforms. Cryptographic techniques, such as secure multi-party computation (MPC), enable the expansion of user groups based on similarities in user profiles without the use of third-party cookies, which preserves user privacy without negatively impacting the ability to expand the user groups and in some cases provides better user group expansion based on more complete profiles than achievable using third-party cookies (i.e., cookies from a different domain, e.g., eTLD+1, than the domain of a resource being accessed by a client device). Additionally, in situations where browsers (or other applications) block the use of third-party cookies, the techniques discussed herein still enable the creation of user groups despite the inability to use third-party cookies, thereby solving the technical problem of how to group data about visits to multiple different websites into datasets without the ability to use third-party cookies. The MPC techniques can ensure that, as long as one of the computing systems in an MPC system is not colluding with the other computing systems, the user data is protected from being revealed in plaintext. As such, the techniques discussed herein also solve the technical problem of how to enable the use of a particular dataset by disparate systems, while preventing any individual system from accessing the particular dataset in plaintext (e.g., in an unencrypted form). The techniques also allow the identification, grouping and transmission of user data in a secure manner, without requiring the use of third-party cookies to determine any relations between user data corresponding to accessing multiple different sites located at different eTLD+1s (effective top level domain plus the part of the domain just before it). This is a distinct approach relative to, and an improvement over, existing methods that require third-party cookies to determine relationships between data collected from disparate sites (e.g., eTLD+1s). By grouping user data in this manner, the efficiency of transmitting data content to user devices is improved as data content that is not relevant need not be transmitted. Particularly, third-party cookies are not required thereby avoiding the storage of third-party cookies, improving memory usage. Exponential decay techniques can be used to build user profiles at client devices to reduce the data size of the raw data needed to build the user profiles, thereby reducing data storage requirements.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is a flow diagram that illustrates an example process for processing a query by a computing multi-party computation system.

Like reference numbers and designations in the various drawings indicate like elements.

DETAILED DESCRIPTION

Figure 1:
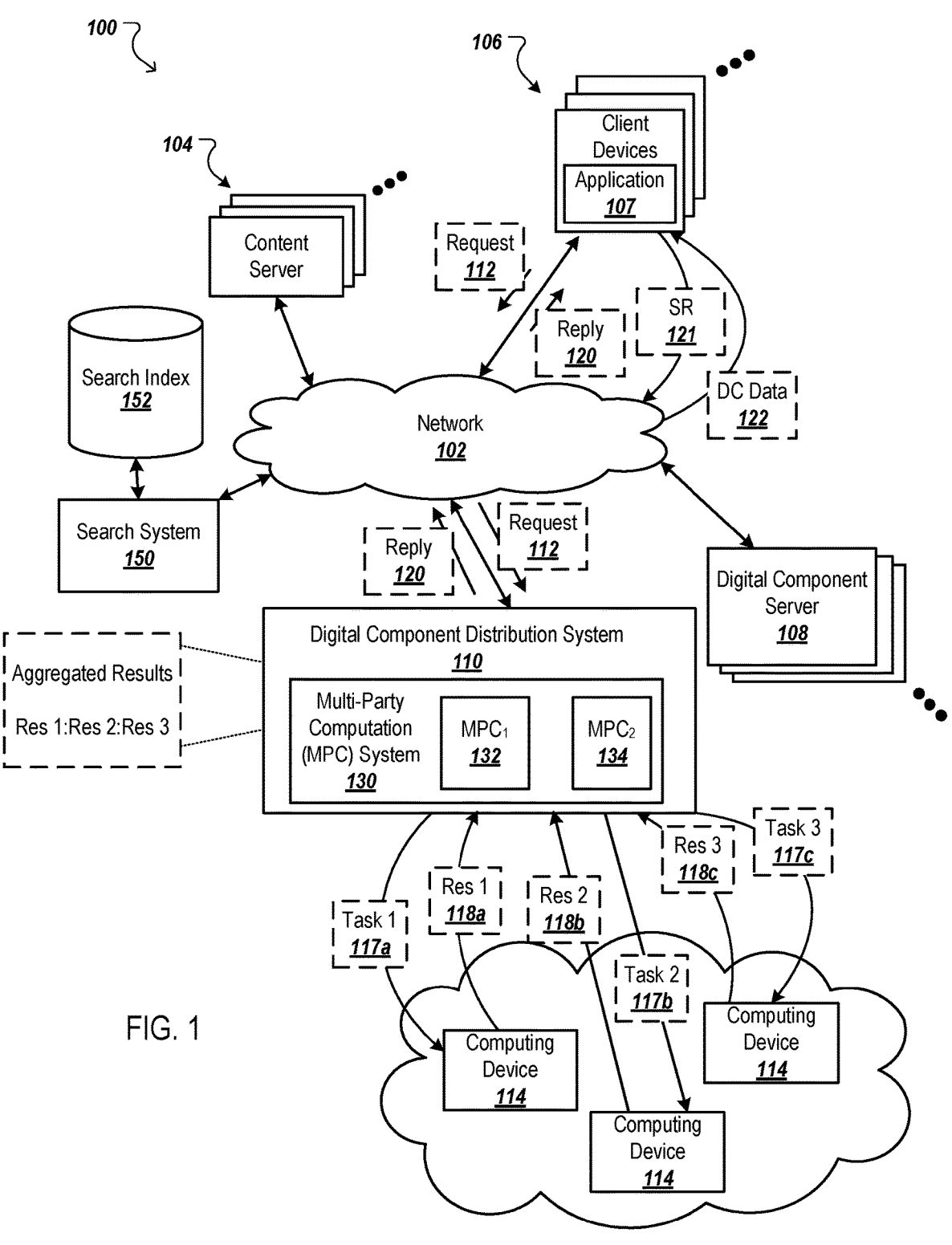
FIG. 1 is a block diagram of an example environment in which digital components are distributed.

This document discloses methods, systems, apparatus, and computer readable media that implements techniques, including the use of machine learning models to identify labels for a dataset without revealing the dataset to any individual computing system. For example, the techniques discussed herein provide access to portions of a dataset to different computing systems, while preventing each computing system from accessing the other portions of the dataset. In some implementations, the portions of the dataset are created by splitting the dataset into portions such each single portion represents an incomplete part of the dataset and does not reveal anything about the dataset.

The computing systems will execute a cryptographic protocol to identify a label for the entire dataset, while limiting any computer system to access only the discrete portion of the dataset to which it is granted access, and return the label in a secure fashion so that only the device requesting a label for the complete dataset will have access to the label. For example, one computing system that is provided a first discrete portion of the dataset can identify a first share of information of the resultant label, encrypt first information identifying the first secret share of the label with a key only known to the device requesting the label for the dataset, and pass the encrypted version of that first information to a second computing system that has been provided a second discrete portion of the dataset. The second computing system can similarly identify a second label, encrypt second information identifying the second label with a key only known to the device requesting the label for the complete dataset, and pass the encrypted version of that second secret share of the label—along with the encrypted version of the first secret share of the label—to yet another computing system if there are other computing systems processing other discrete portions of the complete dataset, or pass the encrypted information to the device that requested the label for the complete dataset.

The device that requested the label for the complete dataset can then decrypt the received information, combine all secret shares of the label to obtain a final label in cleartext for the dataset. As noted above, this technique, which is described in more detail throughout this document solves the technical problem of how to generate a label for a complete dataset without providing access to the complete dataset, which is an improvement in data access technologies and data security.

The techniques discussed in this document can be used in many data processing environments. One environment that can benefit from the use of these techniques is an environment where user data makes up (or is included in) the dataset because these techniques prevent access to a complete set of user data, while still enabling the user data to be labeled in the aggregate. For example, as described in more detail below, these techniques enable the complete set of user data to remain stored in a single trusted location (e.g., at the user's device), while enabling the user data to be processed and/or labeled by remote systems that are capable of running more complex algorithms (e.g., machine learning algorithms) that can be executed at the user's device (e.g., a mobile phone, tablet device, wearable device, voice assistant device, gaming device, or laptop device). As described in detail below, the machine learning models used to determine the labels for discrete portions of data can also be trained using user data that is also protected in a similar way to the discrete portions of data that are labeled by the machine learning models.

FIG. 1 is a block diagram of an example environment 100 in which digital components are distributed for presentation (e.g., with electronic documents). The example environment 100 includes a network 102, such as a local area network (LAN), a wide area network (WAN), the Internet, or a combination thereof. The network 102 connects content servers 104, client devices 106, digital component providers 108, and a digital component distribution system 110 (also referred to as a component distribution system (CDS)).

A client device 106 is an electronic device that is capable of requesting and receiving resources over the network 102. Example client devices 106 include personal computers, mobile communication devices, wearable devices, personal digital assistants, tablet devices, gaming device, media streaming devices, IoT devices (e.g., thermostats, home control units, appliances, and various sensors), and other devices that can send and receive data over the network 102.

A client device 106 typically includes a user application 107, such as a web browser, to facilitate the sending and receiving of data over the network 102, but native applications executed by the client device 106 can also facilitate the sending and receiving of data over the network 102. Client devices 106, and in particular personal digital assistants, can include hardware and/or software that enable voice interaction with the client devices 106. For example, the client devices 106 can include a microphone through which users can submit audio (e.g., voice) input, such as commands, search queries, browsing instructions, smart home instructions, and/or other information. Additionally, the client devices 106 can include speakers through which users can be provided audio (e.g., voice) output. A personal digital assistant can be implemented in any client device 106, with examples including wearables, a smart speaker, home appliances, cars, tablet devices, or other client devices 106.

An electronic document is data that presents a set of content at a client device 106. Examples of electronic documents include webpages, word processing documents, portable document format (PDF) documents, audio, images, videos, search results pages, and feed sources. Native applications (e.g., "apps"), such as applications installed on mobile, tablet, or desktop computing devices are also examples of electronic documents. Electronic documents can be provided to client devices 106 by content servers 104. For example, the content servers 104 can include servers that host publisher websites. In this example, the client device 106 can initiate a request for a given publisher webpage, and the content server 104 that includes web servers that hosts the given publisher web page can respond to the request by sending machine executable instructions that initiate presentation of the given webpage at the client device 106.

In another example, the content server 104 can include app-servers from which client devices 106 can download apps. In this example, the client device 106 can download files required to install an app at the client device 106, and then execute the downloaded app locally. The downloaded app can be configured to present a combination of native content that is part of the application itself, as well as one or more digital components (e.g., content created/distributed by a third party) that are obtained from a digital component server 108, and inserted into the app while the app is being executed at the client device 106.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the client device 106 to request content from the data source when the given electronic document is processed (e.g., rendered or executed) by a client device 106. The client device 106 integrates the content obtained from the data source into the given electronic document to create a composite electronic document including the content obtained from the data source.

In some situations, a given electronic document can include a digital component tag or digital component script that references the digital component distribution system 110. In these situations, the digital component tag or the digital component script is executed by the client device 106 when the given electronic document is processed by the client device 106. Execution of the digital component tag or digital component script configures the client device 106 to generate a request for digital components 112 (referred to as a "component request"), which is transmitted over the network 102 to the digital component distribution system 110. For example, the digital component tag or digital component script can enable the client device 106 to generate a packetized data request including a header and payload data. The digital component request 112 can include event data specifying features such as a name (or network location) of a server from which media is being requested, a name (or network location) of the requesting device (e.g., the client device 106), and/or information that the digital component distribution system 110 can use to select one or more digital components provided in response to the request. The component request 112 is transmitted, by the client device 106, over the network 102 (e.g., a telecommunications network) to a server of the digital component distribution system 110.

The digital component request 112 can include event data specifying other event features, such as the electronic document being requested and characteristics of locations of the electronic document at which digital component can be presented. For example, event data specifying a reference (e.g., Uniform Resource Locator (URL)) to an electronic document (e.g., webpage or application) in which the digital component will be presented, available locations of the electronic documents that are available to present digital component, sizes of the available locations, and/or media types that are eligible for presentation in the locations can be provided to the digital component distribution system 110. Similarly, event data specifying keywords associated with the electronic document ("document keywords") or entities (e.g., people, places, or things) that are referenced by the electronic document can also be included in the component request 112 (e.g., as payload data) and provided to the digital component distribution system 110 to facilitate identification of digital component that are eligible for presentation with the electronic document. The event data can also include a search query that was submitted from the client device 106 to obtain a search results page and/or data specifying search results and/or textual, audible, or other visual content that is included in the search results.

Component requests 112 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 112 can be transmitted, for example, over a packetized network, and the component requests 112 themselves can be formatted as packetized data having a header and payload data. The header can specify a destination of the packet and the payload data can include any of the information discussed above.

The digital component distribution system 110, which includes one or more digital component distribution servers, chooses digital components that will be presented with the given electronic document in response to receiving the component request 112 and/or using information included in the component request 112. In some implementations, a digital component is selected in less than a second to avoid errors that could be caused by delayed selection of the digital component. For example, delays in providing digital components in response to a component request 112 can result in page load errors at the client device 106 or cause portions of the electronic document to remain unpopulated even after other portions of the electronic document are presented at the client device 106. Also, as the delay in providing the digital component to the client device 106 increases, it is more likely that the electronic document will no longer be presented at the client device 106 when the digital component is delivered to the client device 106, thereby negatively impacting a user's experience with the electronic document as well as wasting system bandwidth and other resources. Further, delays in providing the digital component can result in a failed delivery of the digital component, for example, if the electronic document is no longer presented at the client device 106 when the digital component is provided.

To facilitate searching of electronic documents, the environment 100 can include a search system 150 that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index 152 (e.g., hardware memory device(s)). Data that are associated with an electronic document is data that represents content included in the electronic document and/or metadata for the electronic document.

Client devices 106 can submit search queries to the search system 150 over the network 102. In response, the search system 150 accesses the search index 152 to identify electronic documents that are relevant to the search query. The search system 150 identifies the electronic documents in the form of search results and returns the search results to the client device 106 in search results page. A search result is data generated by the search system 150 that identifies an electronic document that is responsive (e.g., relevant) to a particular search query, and includes an active link (e.g., hypertext link) that causes a client device to request data from a specified location in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the client device 106. Another example search result can include a title of streaming media, a snippet of text describing the streaming media, an image depicting contents of the streaming media, and/or a URL to a location from which the streaming media can be downloaded to the client device 106. Like other electronic documents search results pages can include one or more slots in which digital components (e.g., advertisements, video clips, audio clips, images, or other digital components) can be presented.

In some implementations, the digital component distribution system 110 is implemented in a distributed computing system that includes, for example, a server and a set of multiple computing devices 114 that are interconnected and identify and distribute digital components in response to component requests 112. The set of multiple computing devices 114 operate together to identify a set of digital components that are eligible to be presented in the electronic document from among a corpus of millions of available digital components.

In some implementations, the digital component distribution system 110 implements different techniques for selecting and distributing digital components. For example, digital components can include corresponding distribution parameters that contribute to (e.g., condition or limit) the selection/distribution/transmission of the corresponding digital component. For example, the distribution parameters can contribute to the transmission of a digital component by requiring that a component request include at least one criterion that matches (e.g., either exactly or with some pre-specified level of similarity) one of the distribution parameters of the digital component.

In another example, the distribution parameters for a particular digital component can include distribution keywords that must be matched (e.g., by electronic documents, document keywords, or terms specified in the component request 112) in order for the digital components to be eligible for presentation. The distribution parameters can also require that the component request 112 include information specifying a particular geographic region (e.g., country or state) and/or information specifying that the component request 112 originated at a particular type of client device 106 (e.g., mobile device or tablet device) in order for the component item to be eligible for presentation. The distribution parameters can also specify an eligibility value (e.g., rank, score or some other specified value) that is used for evaluating the eligibility of the component item for selection/distribution/transmission (e.g., among other available digital components), as discussed in more detail below. In some situations, the eligibility value can be based on an amount that will be submitted when a specific event is attributed to the digital component item (e.g., presentation of the digital component).

The identification of the eligible digital components can be segmented into multiple tasks 117a-117c that are then assigned among computing devices within the set of multiple computing devices 114. For example, different computing devices in the set 114 can each analyze a different digital component to identify various digital components having distribution parameters that match information included in the component request 112. In some implementations, each given computing device in the set 114 can analyze a different data dimension (or set of dimensions) and pass (e.g., transmit) results (Res 1-Res 3) 118a-118c of the analysis back to the digital component distribution system 110. For example, the results 118a-118c provided by each of the computing devices in the set 114 may identify a subset of digital component items that are eligible for distribution in response to the component request and/or a subset of the digital components that have certain distribution parameters. The identification of the subset of digital components can include, for example, comparing the event data to the distribution parameters, and identifying the subset of digital components having distribution parameters that match at least some features of the event data.

The digital component distribution system 110 aggregates the results 118a-118c received from the set of multiple computing devices 114 and uses information associated with the aggregated results to select one or more digital components that will be provided in response to the component request 112. For example, the digital component distribution system 110 can select a set of winning digital components (one or more digital components) based on the outcome of one or more digital component evaluation processes. In turn, the digital component distribution system 110 can generate and transmit, over the network 102, reply data 120 (e.g., digital data representing a reply) that enable the client device 106 to integrate the set of winning digital component into the given electronic document, such that the set of winning digital components and the content of the electronic document are presented together at a display of the client device 106.

In some implementations, the client device 106 executes instructions included in the reply data 120, which configures and enables the client device 106 to obtain the set of winning digital components from one or more digital component servers 108. For example, the instructions in the reply data 120 can include a network location (e.g., a URL) and a script that causes the client device 106 to transmit a server request (SR) 121 to the digital component server 108 to obtain a given winning digital component from the digital component server 108. In response to the server request 121, the digital component server 108 will identify the given winning digital component specified in the server request 121 and transmit, to the client device 106, digital component data 122 (DC data) that presents the given winning digital component in the electronic document at the client device 106.

In some cases, it is beneficial to a user to receive digital components related to web pages, application pages, or other electronic resources previously visited and/or interacted with by the user. In order to distribute such digital components to users, the users can be assigned to user groups, e.g., user interest groups, cohorts of similar users, or other group types involving similar user data based on the digital content accessed by the user. For example, when a user visits a particular website and interacts with a particular item presented on the website or adds an item to a virtual cart, the user can be assigned to a group of users who have visited the same website or other websites that are contextually similar or are interested in the same item. To illustrate, if the user of the client device 106 searches for shoes and visits multiple webpages of different shoe manufacturers, the user can be assigned to the user group "shoe," which can include identifiers for all users who have visited websites related to shoes.

In some implementations, a user's group membership can be maintained at the user's client device 106, e.g., by a browser based application, rather than by a digital component provider or by a content platform 104, or by another party. The user groups can be specified by a respective user group label. The label for a user group can be descriptive of the group (e.g., gardening group) or a code that represents the group (e.g., an alphanumeric sequence that is not descriptive). The label for a user group can be stored in secure storage at the client device 106 and/or can be encrypted when stored to prevent others from accessing the list.

The digital component servers can use the user group membership of a user to select digital components or other content that may be of interest to the user or may be beneficial to the user/user device in another way (e.g., assisting the user in completing a task). For example, such digital components or other content may comprise data that improves a user experience, improves the running of a user device or benefits the user or user device in some other way. However, a user can be provided the user group label in ways that prevent the content servers from correlating user group identifiers with particular users, thereby preserving user privacy when using user group membership data to select digital components. This document refers to user group membership data and user data as examples of data that should be protected from being accessed by unauthorized parties (or computing systems), but the technology discussed in this document is not limited to such an application and can be used with respect to any dataset that is to be protected from unauthorized access.

The application 107 can provide a user group label to a trusted computing system that interacts with the digital component servers to select digital components for presentation at the client device 107 based on the user group membership in ways that prevent the content platforms or any other entities which are not the user itself from knowing a user's complete user group membership.

In some implementations, a user is assigned to only one user group at a time, and the assignment of a user to a user group is a temporary assignment since the user's group membership can change with respect to the user's browsing activity. For example, when the users starts a web browsing session and visits particular website and interacts with a particular item presented on the website or adds an item to a virtual cart, the user can be assigned to a group of users who have visited the same website or other websites that are contextually similar or are interested in the same item.

However, if the user visits another website and interacts with another type of item presented on the other website, the user is assigned to another group of users who have visited the other website or other websites that are contextually similar or are interested in the other item. For example, if the user starts the browsing session by searching for shoes and visiting multiple webpages of different shoe manufacturers, the user can be assigned to the user group "shoe," which includes all users who have visited websites related to shoes.

Assume that there are 100 users who have previously visited websites related to shoes. When the user is assigned to the user group "shoe", the total number of users included in the user group increases to 101. However after sometime if the user searches for hotels and visits multiple webpages of different hotels or travel agencies, the user can be removed from the previously assigned user group "shoe" and re-assigned to a different user group "hotel" or "travel". In such a case, the number of users in the user group "shoe", reduces back to 100 given that no other user was added or removed from the particular user group.

The number and types of user groups is managed and/or controlled by a system (or administrator). For example, the system may implement an algorithmic and/or machine learning method to oversee the management of the user groups. In general, since the flux of users who are engaged in an active browser session changes with time and since each individual user is responsible for their respective browsing activity, the number of user groups and number of users in each of the user groups changes with time.

In some implementations, the component distribution system 110 includes a multi-party computation (MPC) system 130 that implements a machine learning model to oversee the management of the user groups. The MPC system 130 can train machine learning models that suggest, or can be used to generate suggestions of, user groups to users (or their applications 107) based on the user's profiles. The MPC system 130 includes two computing systems MPC1 132 and MPC2 134 that perform secure privacy preserving techniques to train the machine learning models. Although the example MPC system 130 includes two computing systems, more computing systems can also be used as long as the MPC system 130 includes more than one computing system.

The computing systems MPC1 132 and MPC2 134 can be operated by different entities, which can prevent each entity from having access to the complete user profiles in plaintext when the techniques described in this document are implemented. Plaintext is text that is not computationally tagged, specially formatted, or written in code, or data, including binary files, in a form that can be viewed or used without requiring a key or other decryption device, or other decryption process. For example, one of the computing systems MPC1 132 or MPC2 134 can be operated by a trusted party different from the users' client device 106, the content platforms 104 and the digital component servers 108. For example, an industry group, governmental group, or browser developer may maintain and operate one of the computing systems MPC1 132 and MPC2 134. The other computing system may be operated by a different one of these groups, such that a different trusted party operates each computing system MPC1 132 and MPC2 134. Preferably, the different parties operating the different computing systems MPC1 132 and MPC2 134 have no incentive to collude to endanger user privacy. In some implementations, the computing systems MPC1 132 and MPC2 134 are separated architecturally and are monitored to not communicate with each other outside of performing the secure MPC processes described in this document.

In some implementations, the user profile for a user can be in the form of a feature vector. For example, the user profile can be an n-dimensional feature vector. Each of the n dimensions can correspond to a particular feature and the value of each dimension can be the value of the feature for the user. For example, one dimension may be for whether a particular digital component was presented to (or interacted with by) the user. In this example, the value for that feature could be "1" if the digital component was presented to (or interacted with by) the user or "0" if the digital component has not been presented to (or interacted with by) the user.

The user profile for a user can include data related to events initiated by the user and/or events that could have been initiated by the user with respect to electronic resources, e.g., web pages or application content. The events can include views of electronic resources, views of digital components, user interactions, or the lack of user interactions, with (e.g., selections of) electronic resources or digital components, conversions that occur after user interaction with electronic resources, and/or other appropriate events related to the user and electronic resources.

In some implementations, the application 107, per the request of the content server, may generate a different user profile for different machine learning models owned by the content server. Based on the design goal, different machine learning models may require different training data. For example, a first model may be a k-NN model used to determine whether to add a user to a user group.

When an event occurs, a content server can provide event data related to the event to the application 107 executing on the client device for generating a user profile for the user. In some implementations, to protect the event data during transmission, the content server encrypts the event data prior to transmitting to the application 107. For example, the content server can encrypt the event data using a public encryption key of the application 107 (e.g., PubKeyEnc (event_data, application_public_key).

In some implementations, the event data can include the following items as shown in Table 1 below.

TABLE 1

| Item No. | Content | Description |
|---|---|---|
| 1 | Content Platform Domain (e.g., eTLD + 1 domain) | Content platform's domain that uniquely identifies the content platform |
| 2 | Model Identifier | Unique identifier for the content platform's machine learning model. This item can have multiple values if the same feature vector should be applicable for the training of multiple machine learning models for the same owner domain. |
| 3 | Profile Record | n-dimensional feature vector determined by the content platform based on the event |
| 4 | Creation Timestamp | Timestamp indicating when this token is created |
| 5 | Expiration Time | A date and time at which the feature vector will expire and not be used for the user profile calculation. |
| 6 | Profile Decay Rate | Optional rate that defines the rate at which the weight of this event's data decays in the user profile |
| 7 | Operation | Accumulate user profile |
| 8 | Digital Signature | The content platform's digital signature over items 1-7 |

With reference to Table 1, the model identifier identifies the machine learning model, e.g., k-NN model, for which the user profile will be used to train and predict the user group membership and generate corresponding labels for the predicted user groups. The profile record is an n-dimensional feature vector that includes data specific to the event, e.g., the type of event, the electronic resource or digital component, the context of the electronic resource or digital component time at which the event occurred, and/or other appropriate event data that the content server wants to use in training the machine learning model and making user group interferences.

The application 107 after receiving the event data can decrypt the event data using its private key that corresponds to the public encryption key used to encrypt the event data. The application 107 can verify the event data by (i) verifying the digital signature using a public verification key of the content server that corresponds to the private key of the content server that was used to generate the digital signature and (ii) ensuring that the event data creation timestamp is not stale, e.g., the time indicated by the timestamp is within a threshold amount of time of a current time at which verification is taking place. If the event data is valid, the application 107 can store the event data, e.g., by storing the n-dimensional profile record. If any of the verification fails, the application 107 may ignore the event data, e.g., by not storing the n-dimensional profile record.

In some implementations, the application 107 can compute the user profile by aggregating the n-dimensional feature vector (i.e. the profile record). For example, the user profile may be the average of the n-dimensional feature vectors of the multiple events associated with the user. The result is an n-dimensional feature vector representing the user in the profile space. Optionally, the application 112 may normalize the n-dimensional feature vector to unit length, e.g., using L2 normalization.

In some implementations, the application 107 can compute user profile (P) using the following equation $$P = \sum_{i=1}^{k} \left( e^{-\frac{record\_age\_in\_seconds_i}{decay\_rate\_in\_seconds}} \times F_i \right)$$

where the parameter $F_i$ includes k feature vectors and each vector has n-dimensional features that characterize an event (e.g., a user interaction with content or another event attributable to the user), $record\_age\_in\_seconds_i$ is the amount of time in seconds that the profile record has been stored at the client device and the parameter $decay\_rate\_in\_seconds$ is the decay rate of the profile record in seconds.

In some implementations, the application 107 can update the user profile (P) as and when an event occurs. In such a situation, the application can update the user profile using the following equation $$P' = e^{-\frac{current\_time - user\_profile\_time}{decay\_rate\_in\_seconds}} \times P + F$$

where P' is the updated user is profile and F is the n-dimensional feature vector of the new event and P is the n-dimensional feature vector of the existing user profile generated at user_profile_time.

Figure 2:
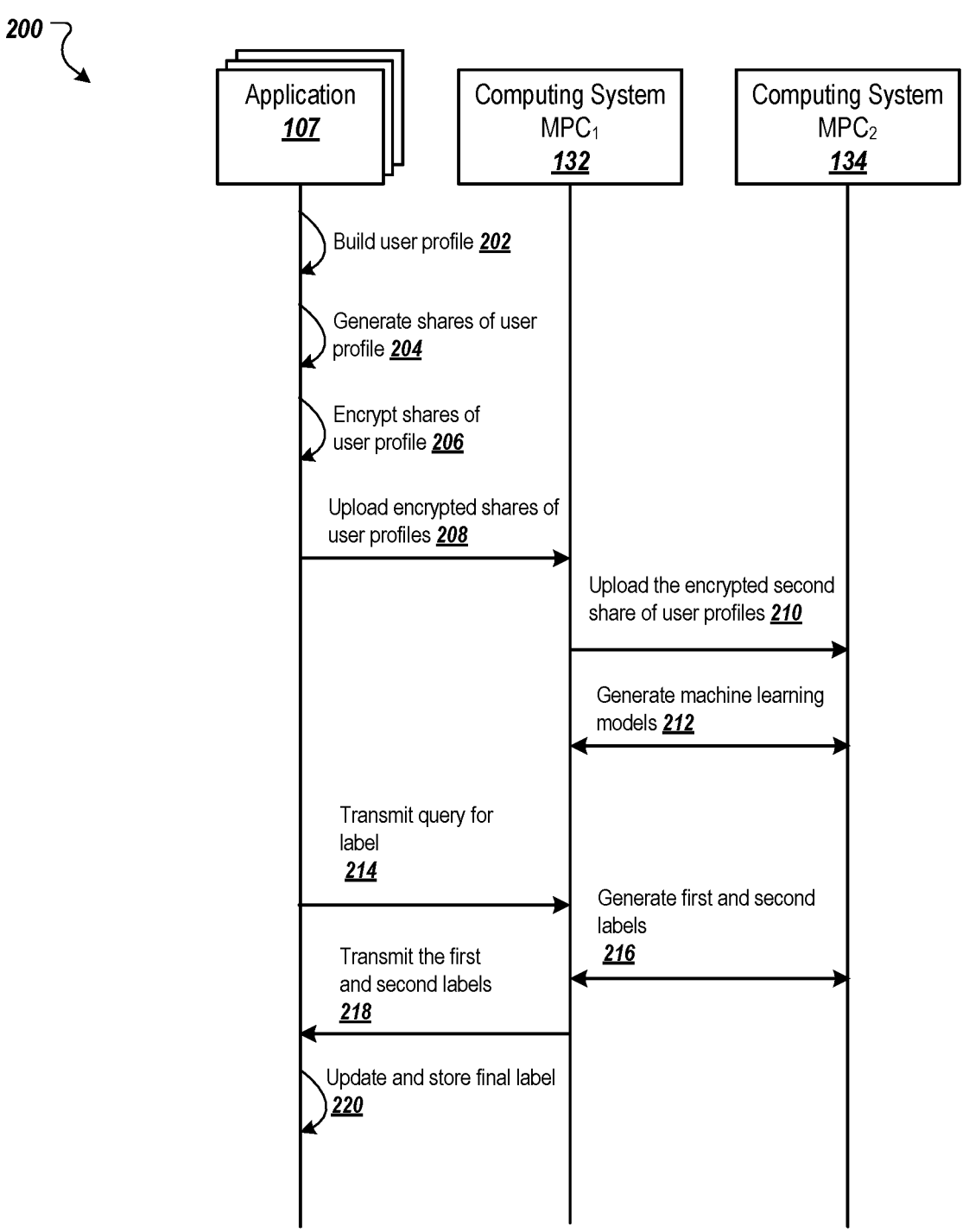
FIG. 2 is a swim lane diagram of an example process for training a machine learning model and using the machine learning model to determine a user group for a user.

FIG. 2 is a swim lane diagram of an example process 200 for training a k-means machine learning model to predict user groups for the user. Operations of the process 200 can be implemented, for example, by the client device 110, the computing systems MPC1 132 and MPC2 134 of the MPC system 130, and a content provider. Operations of the process 200 can also be implemented as instructions stored on one or more computer readable media which may be non-transitory, and execution of the instructions by one or more data processing apparatus can cause the one or more data processing apparatus to perform the operations of the process 200.

A content server can initiate the training and/or updating of one of its machine learning models by requesting that applications 107 running on client devices 106 generate a user profile for their respective users and upload secret-shared and/or encrypted versions of the user profiles to the MPC system 130. For the purposes of this document, secret shares of user profiles can be considered encrypted versions of the user profiles as the secret shares are not in plaintext. In general, each application 107 can store data for a user profile and generate the updated user profile in response to receiving a request from the content platform.

An application 107 running on a client device 106 builds a user profile for a user of the client device 106 (202). The user profile for a user can include data related to events initiated by the user and/or events that could have been initiated by the user with respect to electronic resources, e.g., web pages or application content. The events can include the context of electronic resources, views of electronic resources, views of digital components, user interactions, or the lack of user interactions, with (e.g., selections of) electronic resources or digital components, conversions that occur after user interaction with electronic resources, and/or other appropriate events related to the user and electronic resources.

The user profile for a user can be in the form of a feature vector. For example, the user profile can be an n-dimensional feature vector. Each of the n dimensions can correspond to a particular feature and the value of each dimension can be the value of the feature for the user. For example, one dimension may be for whether a particular digital component was presented to (or interacted with by) the user. In this example, the value for that feature could be "1" if the digital component was presented to (or interacted with by) the user or "0" if the digital component has not been presented to (or interacted with by) the user.

The application 107 generates shares of the user profile for the user (204). In this example, the application 107 generates two shares of the user profile, one for each computing system of the MPC system 130. Note that each share by itself can be a pseudo-random variable that by itself does not reveal anything about the user profile. Both shares would need to be combined to get the user profile. If the MPC system 130 includes more computing systems that participate in the training of a machine learning model, the application 107 would generate more shares, one for each computing system. In some implementations, to protect user privacy, the application 107 can use a pseudorandom function to split the user profile into shares. That is, the application 107 can use pseudorandom function to generate two shares {[$P_{i,1}$], [$P_{i,2}$]}. The exact splitting can depend on the secret sharing algorithm and crypto library used by the application 107.

The application 107 encrypts the shares [$P_{i,1}$] and [$P_{i,2}$] of the user profile (206). In some implementations, the application 107 encrypts the first share [$P_{i,1}$] using a public encryption key of the computing system MPC1 132. Similarly the application 107 encrypts the second share [$P_{i,2}$] of the user profile message using a public encryption key of the computing system MPC2 134. These functions can be represented as PubKeyEncrypt ([$P_{i,1}$], MPC1) and PubKey-Encrypt ([$P_{i,2}$], MPC2), where PubKeyEncrypt represents a public key encryption algorithm using the corresponding public encryption key of MPC1 132 or MPC2 134. In some implementations, the second share is encrypted with a key that prevents MPC 1 132 from accessing the second share, thereby protecting the data included in the second share from being revealed in cleartext by MPC1 132, which enhances the security of the second share by preventing MPC1 132 from being able to recreate the complete set of data that represents the full user profile.

The application 107 executing on the client device 106 uploads the encrypted shares of user profiles to the computing system MPC1 (208). For example, the application 107 uploads the first share (e.g., PubKeyEncrypt ([$P_{i,1}$], MPC1)) and the second share (e.g., PubKeyEncrypt ([$P_{i,2}$], MPC2)) of user profile to MPC1. The computing system MPC1 decrypts the first share of user profile using the private key of the MPC1 and transmits the second secret share of the user profile to MPC2 (210). The MPC2 decrypts the second share of the user profile using the private key of MPC2.

In some implementations, the application 107 must upload the multiple shares of the user profile to the respective MPC system simultaneously to enable the computing systems to properly match all shares of the same user profile. In some implementations, the application 107 can explicitly assign the same pseudo-randomly or sequentially generated identifier to multiple shares of the same user profile to facilitate the matching. While some MPC techniques can rely on random shuffling of input or intermediate results, the MPC techniques described in this document may not include such random shuffling and may instead rely on the upload order to match.

In some implementations, the operations 208 and 210 can be replaced by an alternative process where the application 107 can upload the multiple shares of the user profile to the content server and the content server uploads the multiple shares to the MPC system. This alternative process can increase the infrastructure cost of the content server to support the operations 208 and 210. It can also increase the latency to start training or updating the machine learning model in the MPC system. However, this alternative process can allow the content server to store and manage user data without revealing any user details to the content server thereby maintaining user privacy.

In some implementations, the content server can collect shares of multiple different user profiles (or other datasets), and each share can be separately encrypted as discussed above (e.g., in a way such that secret shares intended for a particular MPC server can be accessed only by the particular MPC server). Using the content server as the aggregator of shares of multiple different user profiles can enable the collection and uploading of many different encrypted user profiles that can be used to train one or more machine learning models. While the training of the machine learning model generally occurs prior to a request for a label, machine learning models can continue to be updated using newly gathered data even after the machine learning model has been used to generate labels. The following paragraphs discuss the training of the model, which is used to generate the labels using the encrypted shares of a user profile discussed above.

The computing systems MPC1 132 and MPC2 134 generate a machine learning model (212). In some implementations, the machine learning model implemented by the MPC1 132 and MPC2 134 system within the MPC system 130 is a k-means model. In general, a k-means algorithm is an algorithm that tries to partition the dataset into k distinct non-overlapping groups (clusters) where each data point belongs to only one group (cluster). The computing systems MPC1 132 and MPC2 134 can train the k-means model based on the encrypted shares of the user profiles received from the application 107 using MPC techniques.

To minimize or at least reduce the crypto computation, and thus the computational burden placed on the computing systems MPC1 132 and MPC2 134 to protect user privacy and data during both model training and inference, the MPC system 130 can use random projection techniques, e.g., SimHash, to quantify the similarity between two user profiles $P_i$ and $P_j$ quickly, securely, and probabilistically. The similarity between the two user profiles $P_i$ and $P_j$ can be determined by determining the Hamming distance between two bit vectors that represent the two user profiles $P_i$ and $P_j$, which is proportional to the cosine similarity between the two user profiles with high probability.

Conceptually, for each training session, m random projection hyperplanes U={$U_1$, $U_2$ . . . $U_m$} can be generated. The random projection hyperplanes can also be referred to as random projection planes. One objective of the multi-step computation between the computing systems MPC1 132 and MPC2 134 is to create a bit vector $B_i$ of length m for each user profile Pi used in the training of the k-means model. In this bit vector $B_i$, each bit $B_{i,j}$ represents the sign of a dot product of one of the projection planes $U_j$ and the user profile $P_i$, i.e. $B_i$, j=sign($U_j$⊙$P_i$), for all where ⊙ denotes the dot product of two vectors of equal length. That is, each bit represents which side of the plane $U_j$ the user profile $P_i$ is located. A bit value of one represents a positive sign and a bit value of zero represents a negative sign.

At the end of the multi-step computation, each of the two computing systems MPC1 132 and MPC2 134 generates an intermediate result that includes a bit vector for each user profile in cleartext and a share of each user profile. For example, the intermediate result for computing system MPC1 132 can be the data shown in Table 2 below. The computing system MPC2 134 would have a similar intermediate result but with a different share of each user profile. To add extra privacy protection, each of the two servers in the MPC system 130 can only get half of the m-dimensional bit vectors in cleartext, e.g., computing system MPC1 132 get the first m/2 dimension of all the m-dimension bit vectors, computing system MPC2 134 gets the second m/2 dimension of all the m-dimension bit vectors.

TABLE 2

| Bit Vector in Cleartext | MPC1 132 Share for $P_i$ |
|---|---|
| . . . | . . . |
| $B_i$ | . . . |
| $B_{i+1}$ | . . . |
| . . . | . . . |

Given two arbitrary user profile vectors $P_i$ and $P_j$ of unit length i≠j, it has been shown that the Hamming distance between the bit vectors $B_i$ and $B_j$ for the two user profile vectors $P_i$ and $P_j$ is proportional to the cosine similarity between the user profile vectors $P_i$ and $P_j$ with high probability, assuming that the number of random projections m is sufficiently large.

Based on the intermediate result shown above and because the bit vectors $B_i$ are in cleartext, each computing system MPC1 132 and MPC2 134 can independently create, e.g., by training, a respective k-means model using a k-means algorithm.

In some implementations, the number of clusters k in the k-means model is chosen according to the equation $$k = z * 2^{-x}$$

Where z is the number of applications 107 and x is bits of entropy. For example, assume that a total of 256 number of applications have to be grouped (or clustered) together such that each group includes the same number of applications and the number of entropy bits (x) is 5. In such a scenario, the k-means model generates k=8 clusters where each cluster includes 32 applications. An example process for training a k-means model is illustrated with reference to FIG. 4.

In some implementations, after generating the clusters of the user profiles by the k-means model, each cluster is assigned a unique identifier (referred to as a label). For example, if there are 10 clusters, the clusters can be labelled using numbers 1 to 10. In another implementation, the clusters generated by the k-means model can be assigned a label based on the prior label of the majority of the user profiles in the respective clusters. For example, assume that a cluster includes 32 user profiles. Also assume that 20 out of the 32 user profiles have a same prior label "id_x". In such a scenario, the cluster is assigned the label "id_x". However, it should be noted that to implement such a labelling technique, the application 107 has to upload the corresponding prior label to the respective MPC system 130 along with the shares of user profile. In such a case, each encrypted share of the user profile includes the share of the user profile and the prior label.

The application 107 transmits a query for user group label to the MPC system 130 (214). In this example, the application 107 transmits the query for user group label to computing system MPC1 132 that includes the first encrypted share and the second encrypted share of the user profile. In other examples, the application 107 can transmit the query for user group label to computing system MPC2. The application 107 can submit the query for user group label in response to a request from the content server to provide the label of the user group to which the application 107 is assigned to. For example, the content server can request the application 107 to query the k-means model to determine the user group label of the application 107 of the client device 110.

To initiate a query for user group label, the content server can send, to the application 107, a token $M_{infer}$ for the query for user group label. The token $M_{infer}$ enables servers in the MPC system 130 to validate that the application 107 is authorized to query the k-means model of the content server that is implemented by the MPC system 130. The token Minfer is optional if the model access control is optional.

In some implementations, the token $M_{infer}$ can include a digital signature based on the contents of the token and a token creation time using a private key of the content server.

To query for user group label for a particular user, the content server can generate a token Minfer for the query for user group label and send the token to the application 107 running on the user's client device 106. In some implementations, the content server encrypts the token Minfer using a public encryption key of the application 107 so that only the application 107 can decrypt the token Minfer using its confidential private key that corresponds to the public encryption key. That is, the content platform can send, to the application 107, PubKeyEnc($M_{infer}$, application_public_key).

The application 107 can decrypt and verify the token $M_{infer}$. The application 107 can decrypt the encrypted token Minfer using its private key. The application 107 can verify the token $M_{infer}$ by (i) verifying the digital signature using a public encryption key of the content server that corresponds to the private key of the content server that was used to generate the digital signature and (ii) ensuring that the token creation timestamp is not stale, e.g., the time indicated by the timestamp is within a threshold amount of time of a current time at which verification is taking place. If the token $M_{infer}$ is valid, the application 107 can query the MPC system 130.

Conceptually, the query for user group label can include a model identifier for identifying a particular machine learning model from among the multiple machine learning models that can be implemented to predict user groups and the corresponding labels. The query may also include the current user profile $P_i$. However, to prevent leaking the user profile $P_i$ in plaintext form to either computing system MPC1 132 or MPC2 134, and thereby preserve user privacy, the application 107 can split the user profile Pi into two shares $[P_{i, 1}]$ and $[P_{i, 2}]$ for MPC1 132 and MPC2, respectively. The application 107 can then select one of the two computing systems MPC1 132 or MPC2 134, e.g., randomly or pseudorandomly, for the query. If the application 107 selects computing system MPC1, the application 107 can send a single query to computing system MPC1 132 with the first share $[P_{i,1}]$ and an encrypted version of the second share, e.g., PubKeyEncrypt($[P_{i,2}]$, MPC2). In this example, the application 107 encrypts the second share $[P_{i, 2}]$ using a public encryption key of the computing system MPC2 134 to prevent computing system MPC1 132 from accessing $[P_{i, 2}]$, which would enable computing system MPC1 132 to reconstruct the user profile $P_i$ from $[P_{i, 1}]$ and $[P_{i, 2}]$.

The MPC system 130 determines the labels for the user profile (216). In some implementations, each computing system within the MPC system 130 determines a corresponding label (or partial label) based on the share of user profile received from the application 107. Each computing system within the MPC system 130, after receiving the respective share of user profiles performs similar operation as mentioned in Step 212 and converts the respective shares into bit vectors. After converting the shares into bit vectors, the each computing system in the MPC system 130 determines the cluster with a centroid that is closest to the respective bit vector. For example and as mentioned above, the application 107 can select one of the two computing systems MPC1 132 or MPC2, e.g., randomly or pseudo-randomly, for the query. If the application 107 selects computing system MPC1, the application 107 can send a single query to computing system MPC1 132 with the first share $[P_{i,1}]$ and an encrypted version of the second share, e.g., PubKeyEncrypt($[P_{i, 2}]$, MPC2). The encrypted version of the second share $[P_{i, 2}]$ of the user profile is transmitted to the computing system MPC2 134. The MPC2 decrypts the second share $[P_{i, 2}]$ using the private key of the computing system MPC2. The MPC1 132 and MPC2 134 perform crypto operations described in Step 212 to generate a first bit vector based on the first share $[P_{i, 1}]$ held confidentially by MPC1 and the second share $[P_{i, 2}]$ held confidentially by MPC2. The MPC1 132 determines the cluster (referred to as the first cluster) with a centroid that is closest to the first bit vector. An identifier for the cluster can be selected as the label (or partial label) of the first share.

The computing system MPC1 132 models the users of the first cluster using a n-dimensional normal distribution parameterized as $x \sim N_n(\mu_1, \Sigma_1)$ where $\mu_1$ is the n-dimensional centroid of the first cluster and $\Sigma_1$ is the covariance matrix of dimension n×n. In this example, MPC1 132 calculates $\mu_1 = \Sigma_{i \in ID}[P_{i,1}]$. Similarly MPC2 134 calculates $\mu_2 = \Sigma_{i \in ID}[P_{i, 2}]$ where $[\mu_1]$ and $[\mu_2]$ are the secret shares of k×μ and k is a known number in cleartext.

To compute the covariance matrix $\Sigma$, the MPC1 132 calculates $[\Sigma_1] = \Sigma_{i \in ID}(k*[P_{i,1}] - \mu_1^T * (k*[P_{i,1}] - \mu_1)$ in which $k*[P_{i,1}] - \mu_1$ is a matrix of 1×n secret shares and $(k*[P_{i,1}] - \mu_1)$ is a transposed version of the matrix $k*[P_{i,1}] - \mu_1$ with a dimension n×1. This results in the covariance matrix to have a dimension of n×n. Similarly MPC2 134 can compute$[\Sigma_2] = \Sigma_{i \in ID}(k*[P_{i,2}] - \mu_2*(k*[P_{i,2}] - \mu_2)$.

MPC1 132 and MPC2 134 can construct the covariance matrix $\Sigma$ using the two secret shares $[\Sigma_1]$ and $[\Sigma_2]$ following the equation $$\sum = \frac{1}{k^2} * \text{reconstruct}\left( [\sum{}_1], [\sum{}_2] \right)$$

where the function reconstruct( ) generates the secret in plaintext from the two secret shares. Either MPC1 132 or MPC2 134 can calculate an integer matrix A via cholesky decomposition such the $A*A^T = \Sigma$. After calculating matrix A, the matrix A is shared with the other computing system of the MPC system 130.

In this example, after modelling users of the first cluster using a n-dimensional normal distribution parameterized as $x \sim N_n(\mu, \Sigma)$, the MPC1 132 can generate a random vector $z = (z_1, \ldots, z_n)^T$ randomly drawn from standard normal distribution using Box-Muller transform. The MPC1 132 then splits z into two shares $[z_1]$ and $[z_2]$. The MPC1 132 then shares $[z_2]$ with MPC2. Similarly the MPC2 134 can generate a random vector $z' = (z'_1, \ldots, z'_n)^T$ randomly drawn from standard normal distribution using Box-Muller transform. The MPC2 134 then splits z into two shares [z'₁] and [z'₂]. The MPC2 134 then shares [z₁] with MPC1. The MPC1 132 then computes the first label $$result_1 = [\mu_2] + \frac{1}{2^{1/2}} * k * A * ([z_1] + [z'_1]).$$

Similarly the MPC2 134 then computes the second label $$result_2 = [\mu_2] + \frac{1}{2^{1/2}} * k * A * ([z_2] + [z'_2]).$$

The MPC system transmits the user group labels to the application 107 (218). The computing system MPC2 134 can provide an encrypted version of the second label, i.e. [result2] to the computing system MPC1, where the second label is encrypted using a public encryption key of the application 107. The computing system MPC1 132 can provide, to the application 107, the first label of the resultant cluster, i.e. [result₁], and the encrypted version of the second label of the second cluster determined by the computing system MPC2. The application 107 can decrypt the second label of the resultant cluster that was determined by the computing system MPC2 in association with MPC1. In some implementations, to prevent computing system MPC1 132 from falsifying computing system MPC2's result, computing system MPC2 134 digitally signs its result either before or after encrypting its result using the public encryption key of the application 107. The application 107 verifies computing system MPC2's digital signature using the public encryption key of MPC2.

The application 107 updates and stores the user group label (220). After receiving the first label and the second label from the MPC system 130, the application can calculate the final label as final_result=1/k*reconstruct([result₁], [result₂]) and stores the label on the client device 106. In this implementation, the FLoC ID is a n-dimensional vector randomly generated for the user group of which the user is a member.

As mentioned before, the user group label is just an identifier for the user group to which the user belongs with no contextual meaning that the content platforms such as digital component providers can leverage to select digital components for the application 107. As a solution, the MPC system 130 can share certain information such as the centroid of the clusters of the k-means machine learning model to the digital component providers. The centroids of the clusters of the k-means machine learning model implemented by the MPC system 130 have the same dimension as the user profiles (P_i). Sharing the centroids to the content platforms would allow the content platforms to provide digital components based on the prior events that occurred because of user activity.

For example, assume that the n-dimensional user profile is updated by the application 107 based on events that happened as a result of user actions. The MPC 130 system determines the cluster to which the application 107 belongs based on the distance between the n-dimensional feature vector user profile provided by the application 107 and the n-dimensional feature vector of the centroid of the clusters of the k-means model. The applications 107 after receiving the label of the user stores the label in the client device 106. Assume that the MPC system 130 has shared the n-dimensional centroid feature vector to the digital component provider. When the application loads a resource that includes one or more digital component slots, the client device 106 or the content server that is providing the resource generates a request for digital component that includes the label of the application 107. Upon receiving the request for digital component, the digital component provider can provide digital components based on the n-dimensional centroid of the cluster to which the application belongs.

However, sharing the centroid of clusters with the content platforms raises privacy concerns. To overcome the problem, the MPC system 130 makes use of differential privacy techniques and generates new centroids of the clusters by adding random noise to the centroids. The details are further explained with reference to FIG. 3.

Figure 3:
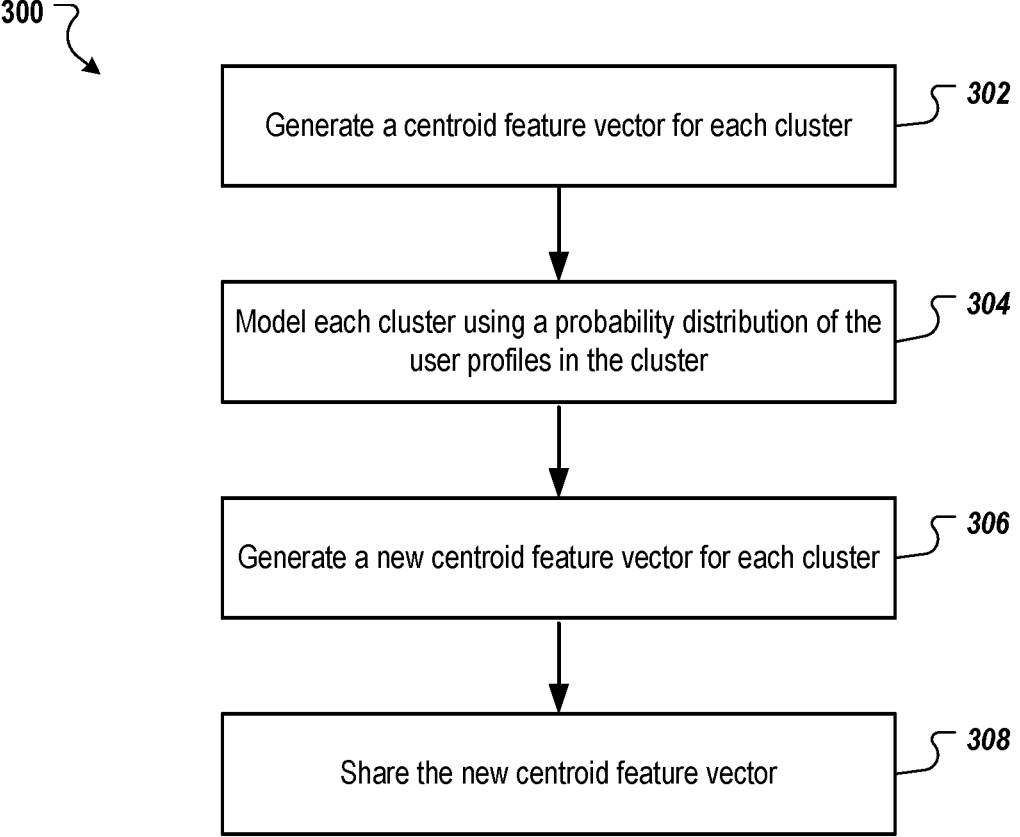
FIG. 3 is a flow diagram of an example process of adding differential privacy to the cluster centroids.

FIG. 3 is a flow diagram of an example process 300 to generate new centroids of the clusters of user profiles using differential privacy techniques. Operations of the process 300 can be implemented, for example, by the computing systems MPC1 132 and MPC2 134 of the MPC system 130. Operations of the process 300 can also be implemented as instructions stored on one or more computer readable media which may be non-transitory, and execution of the instructions by one or more data processing apparatus can cause the one or more data processing apparatus to perform the operations of the process 300.

The MPC system 130 generates a centroid feature vector for each cluster (302). For example, the computing systems of the MPC system 130 uses k-means clustering algorithm to cluster user profiles into k clusters. In this particular example, the MPC1 132 and MPC2 134 train a k-means machine learning model as described in step 212 of the process 200. Training a k-means model requires computing the centroid of the clusters. Since the user profiles are n-dimensional feature vectors, the k-means clustering algorithm forms clusters in an n-dimensional feature space and generates n-dimensional centroids for each cluster.

The MPC system 130 models each cluster using a probability distribution of the user profiles in the cluster (304). For example, the computing systems of the MPC system 130 models the users of each cluster of the k-means machine learning model as a normal distribution using steps 218 of the process 200.

The MPC system 130 generates a new centroid feature vector for each cluster (306). For example, the computing systems of the MPC system 130 can generate a random feature vector for each of the multiple clusters of the k-means machine learning model by randomly sampling from standard normal distribution using Box-Muller transform. In this example, each computing system MPC1 132 and MPC2 134 generates a respective random feature vector for the centroids of the clusters of the k-means machine learning model. In some implementations, to provide stronger privacy protection, computing system MPC1 132 and MPC2 134 execute a crypto protocol to collaboratively generate a respective random feature vector for the centroids of the clusters of the k-means machine learning model and the generated centroids are in the form of secret shares.

The MPC system 130 shares the new centroid feature vector with the digital component providers (308). For example, instead of sharing the actual centroid of the clusters of the k-means machine learning model, the MPC system 130 shares the random feature vector with the digital component providers.

Figure 4:
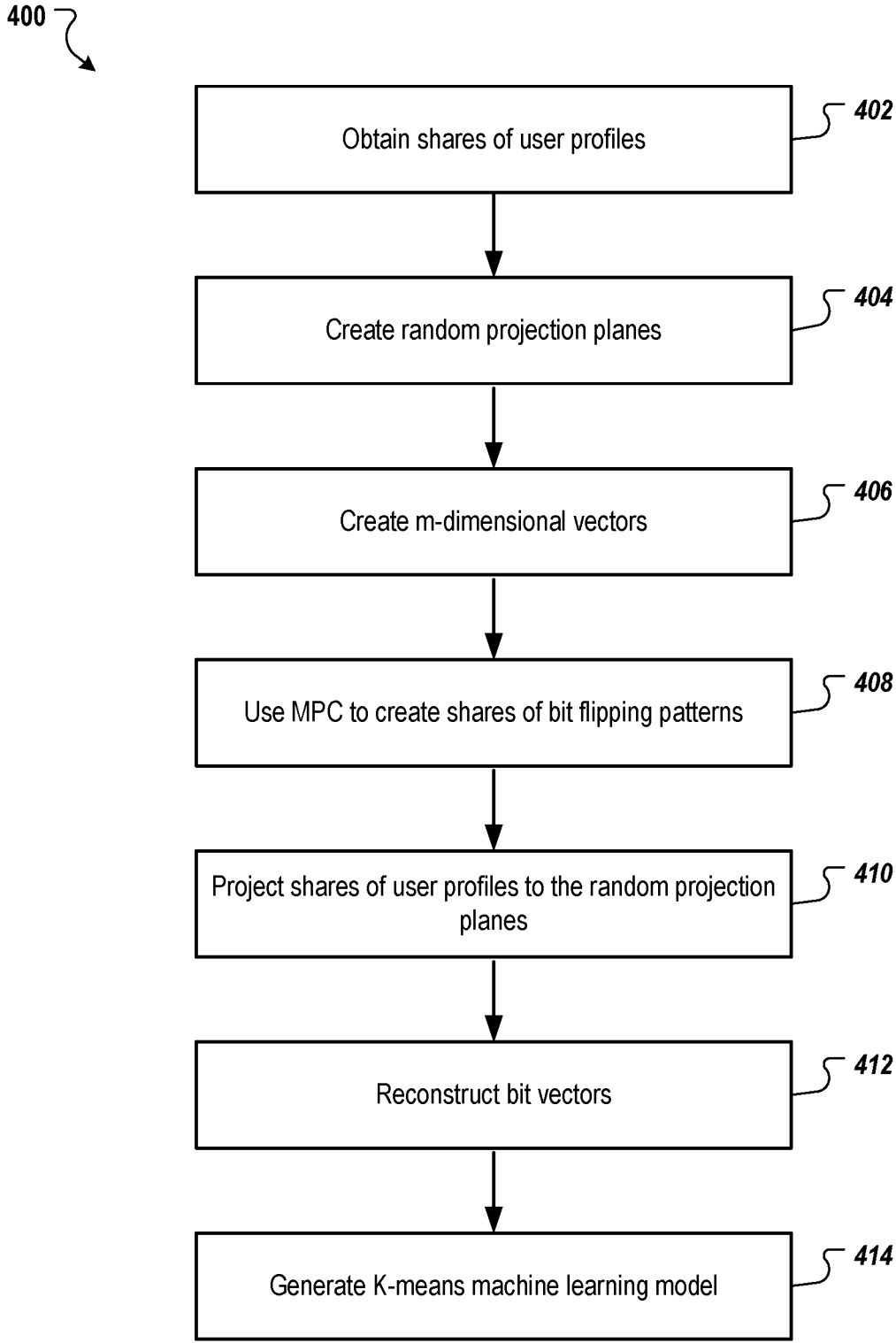
FIG. 4 is a flow diagram that illustrates an example process for generating a k-means model.

FIG. 4 is a flow diagram that illustrates an example process 400 for generating a k-means machine learning model. Operations of the process 400 can be implemented, for example, by the MPC system 130 of FIG. 1. Operations of the process 400 can also be implemented as instructions stored on one or more computer readable media which may be non-transitory, and execution of the instructions by one or more data processing apparatus can cause the one or more data processing apparatus to perform the operations of the process 400.

The MPC system 130 obtains shares of user profiles (402). A content server can request an application 107 to update and/or obtain the label of the user group to which the application belongs. The application 107 in response to the request can upload shares of user profile to the MPC system 130 to train a k-means machine learning model.

For example, the application 107 can transmit, to computing system MPC1, the encrypted first share of the user profile (e.g., PubKeyEncrypt([$P_{i,\ 1}$], MPC1)) for its user profile $P_i$. Similarly, the application 107 can transmit, to computing system MPC2, the encrypted second share of the user profile (e.g., PubKeyEncrypt([$P_{i,2}$], MPC2)) for its user profile $P_i$.

The computing systems MPC1 132 and MPC2 134 create random projection planes (404). The computing systems MPC1 132 and MPC2 134 can collaboratively create m random projection planes $U=\{U_1, U_2 \ldots U_m\}$. These random projection planes should remain as secret shares between the two computing systems MPC1 132 and MPC2. In some implementations, the computing systems MPC1 132 and MPC2 134 create the random projection planes and maintain their secrecy using the Diffie-Hellman key exchange technique.

As described in more detail below, the computing systems MPC1 132 and MPC2 134 will project their shares of each user profile onto each random projection plane and determine, for each random projection plane, whether the share of the user profile is on one side of the random projection plane. Each computing system MPC1 132 and MPC2 134 can then build a bit vector in secret shares from secret shares of the user profile based on the result for each random projection. Partial knowledge of the bit vector for a user, e.g., whether or not the user profile Pi is on one side of the projection plane $U_k$ allows either computing system MPC1 132 or MPC2 134 to gain some knowledge about the distribution of $P_i$, which is incremental to the prior knowledge that the user profile $P_i$ has unit length. To prevent the computing systems MPC1 132 and MPC2 134 gaining access to this information (e.g., in implementations in which this is required or preferred for user privacy and/or data security), in some implementations, the random projection planes are in secret shares, therefore neither computing system MPC1 132 nor MPC2 134 can access the random projection planes in cleartext. In other implementations, a random bit flipping pattern can be applied over random projection results using secret share algorithms, as described in optional operations 406-408.

To demonstrate how to flip bits via secret shares, assume that there are two secrets x and y whose values are either zero or one with equal probability. An equality operation [x]==[y] will flip the bit of x if y==0 and will keep the bit of x if y==1. In this example, the operation will randomly flip the bit x with 50% probability. This operation can require remote procedure calls (RPCs) between the two computing systems MPC1 132 and MPC2 134 and the number of rounds depends on the data size and the secret share algorithm of choice.

Each computing system MPC1 132 and MPC2 134 create a secret m-dimensional vector (406). The computing system MPC1 132 can create a secret m-dimension vector $\{S_1, S_2 \ldots S_m\}$, where each element Si has a value of either zero or one with equal probability. The computing system MPC1 132 splits its m-dimensional vector into two shares, a first share $\{[S_{1,1}], [S_{2,1}], \ldots [S_{m,1}]\}$ and a second share $\{[S_{1,2}], [S_{2,2}], \ldots [S_{m,2}]\}$. The computing system MPC1 132 can keep the first share secret and provide the second share to computing system MPC2. The computing system MPC1 132 can then discard the m-dimensional vector $\{S_1, S_2 \ldots S_m\}$.

The computing system MPC2 134 can create a secret m-dimension vector $\{T_1, T_2 \ldots T_m\}$, where each element Ti has a value of either zero or one. The computing system MPC2 134 splits its m-dimensional vector into two shares, a first share $\{[T_{1,1}], [T_{2,1}], \ldots [T_{m,1}]\}$ and a second share $\{[T_{1,2}], [T_{2,2}], \ldots [T_{m,2}]\}$. The computing system MPC2 can keep the first share secret and provide the second share to computing system MPC1. The computing system MPC2 134 can then discard the m-dimensional vector $\{T_1, T_2 \ldots T_m\}$.

The two computing systems MPC1 132 and MPC2 134 use secure MPC techniques to calculate shares of a bit flipping pattern (408). The computing systems MPC1 132 and MPC2 134 can use a secure share MPC equality test with multiple roundtrips between the computing systems MPC1 132 and MPC2 134 to compute shares of the bit flipping pattern. The bit flipping pattern can be based on the operation [x]==[y] described above. That is, the bit flipping pattern can be $\{S_1==T_1, S_2==T_2 \ldots S_m==T_m\}$. Let each $ST_i=(S_i==T_i)$. Each $ST_i$ has a value of either zero or one. After the MPC operation is completed, computing system MPC1 132 has a first share $\{[ST_{1,1}], [ST_{2,1}], \ldots [ST_{m,1}]\}$ of the bit flipping pattern and computing system MPC2 134 has a second share $\{[ST_{1,2}], [ST_{2,2}], \ldots [ST_{m,2}]\}$ of the bit flipping pattern. The shares of each $ST_i$ enable the two computing systems MPC1 132 and MPC2 134 to flip the bits in bit vectors in a way that is opaque to either one of the two computing systems MPC1 132 and MPC2 134.

Each computing system MPC1 132 and MPC2 134 projects its shares of each user profile onto each random projection plane (410). That is, for each user profile that the computing system MPC1 132 received a share, the computing system MPC1 132 can project the share [$P_{i,1}$] onto each projection plane $U_j$. Performing this operation for each share of a user profile and for each random projection plane $U_j$ results in a matrix R of z×m dimension, where z is the number of user profiles available and m is the number of random projection planes. Each element $R_{ij}$ in the matrix R can be determined by computing the dot product between the projection plane $U_j$ and the share [$P_{i,1}$], e.g., $R_{ij}$=sign $(U_j P_{i,\ 1})$. The operation $\odot$ denotes the dot product of two vectors of equal length.

If bit flipping is used, computing system MPC1 132 can modify the values of one or more of the elements $R_{ij}$ in the matrix using the bit flipping pattern secretly shared between the computing systems MPC1 132 and MPC2 134. For each element $R_{ij}$ in the matrix R, computing system MPC1 132 can compute, as the value of the element $R_{i,j}$, [$ST_{j,1}$]==sign $(R_{i,j})$. Thus, the sign of the element $R_{i,j}$ will be flipped if its corresponding bit in the bit [$ST_{j,1}$] in the bit flipping pattern has a value of zero. This computation can require multiple RPCs to computing system MPC2 134.

Similarly, for each user profile that the computing system MPC2 134 received a share, the computing system MPC2 134 can project the share [$P_{i,\ 2}$] onto each projection plane $U_j$. Performing this operation for each share of a user profile and for each random projection plane $U_j$ results in a matrix R' of z×m dimension, where z is the number of user profiles available and m is the number of random projection planes.

Each element $R_{i,j}'$ in the matrix R' can be determined by computing the dot product between the projection plane $U_j$ and the share $[P_{i,2}]$, e.g., $R_{i,j}'=U_j\odot[P_{i,2}]$. The operation $\odot$ denotes the dot product of two vectors of equal length.

If bit flipping is used, computing system MPC2 134 can modify the values of one or more of the elements Ri,j in the matrix using the bit flipping pattern secretly shared between the computing systems MPC1 132 and MPC2 134. For each element Ri,j' in the matrix R, computing system MPC2 134 can compute, as the value of the element Ri,j', [STj,2]==sign (Ri,j'). Thus, the sign of the element Ri,j' will be flipped if its corresponding bit in the bit $[ST_{j,2}]$ in the bit flipping pattern has a value of zero. This computation can require multiple RPCs to computing system MPC1.

The computing systems MPC1 132 and MPC2 134 reconstruct bit vectors (412). The computing systems MPC1 132 and MPC2 134 can reconstruct the bit vectors for the user profiles based on the matrices R and R', which have exactly the same size. For example, computing system MPC1 132 can send a portion of the columns of matrix R and computing system MPC2 134 can send the remaining portion of the columns of matrix R' to MPC1. In a particular example, computing system MPC1 132 can send the first half of the columns of matrix R to computing system MPC2 134 and computing system MPC2 134 can send the second half of the columns of matrix R' to MPC1. Although columns are used in this example for horizontal partition and are preferred to protect user privacy, rows can be used in other examples for vertical reconstruction.

In this example, computing system MPC2 134 can combine the first half of the columns of matrix R' with the first half of the columns of matrix R received from computing system MPC1 132 to reconstruct the first half (i.e. m/2 dimension) of bit vectors in cleartext. Similarly, computing system MPC1 132 can combine the second half of the columns of matrix R with the second half of the columns of matrix R' received from computing system MPC2 134 to reconstruct the second half (i.e. m/2 dimension) of bit vectors in cleartext. Conceptually, the computing systems MPC1 132 and MPC2 134 have now combined corresponding shares in two matrices R and R' to reconstruct bit matrix B in plaintext. This bit matrix B would include the bit vectors of the projection results (projected onto each projection plane) for each user profile for which shares were received from the application 107 for the machine learning model. Each one of the two servers in the MPC system 130 owns half of the bit matrix B in plaintext.

However, if bit flipping is used, the computing systems MPC1 132 and MPC2 134 have flipped bits of elements in the matrices R and R' in a random pattern fixed for the machine learning model. This random bit flipping pattern is opaque to either of the two computing systems MPC1 132 and MPC2 134 such that neither computing system MPC1 132 nor MPC2 134 can infer the original user profiles from the bit vectors of the project results. The crypto design further prevents MPC1 132 nor MPC2 134 from inferring the original user profiles by horizontally partitioning the bit vectors, i.e. computing system MPC1 132 holds the second half of bit vectors of the projection results in plaintext and computing system MPC2 134 holds the first half of bit vectors of the projection results in plaintext.

The MPC system 130 generates a machine learning model (414) The computing systems MPC1 132 and MPC2 134 within the MPC system 130 can generate a machine learning model using the bit vectors corresponding to the user profiles generated previously. In some implementations, if the machine learning model is a k-nn model, each of the two MPC computing systems 132 and 134 can generate a separate k-nn model using the corresponding halves of the bit vectors. For example, the MPC system 132 can generate a k-nn model using the second half of the bit vectors. Additionally, computing system MPC2 134 can generate a k-nn model using the first half of the bit vectors. Generating the models using bit flipping and horizontal partitioning of the matrices applies the defense-in-depth principle to protect the secrecy of the user profiles used to generate the models.

In some implementations, if the machine learning model is a k-means model, the computing system MPC1 132 or MPC 2 134 can generate a single k-means model using the two halves of the bit vectors. For example, the computing system MPC 1 132 generates a k-means model using the two halves of the bit vectors. However, in some implementations, each of the computing systems MPC1 132 and MPC2 134 can generate a separate K-means model. In general, the k-means model represents cosine similarities (or distances) between the user profiles of a set of users. The k-means model generated by either of the computing system MPC1 132 or MPC 2 134 represents the similarity between the bit vectors.

The k-means models generated by the computing systems MPC1 132 or MPC2 134 can be referred to as a k-means model, which has a unique model identifier as described above. The computing systems MPC 130 can store the model and shares of the labels for each user profile used to generate the models. The application 107 can then query the models to make inferences for the label of the user group to which the application 107 belongs.

FIG. 5 is a flow diagram that illustrates an example process 500 for training and querying a computation system of the MPC system 130. Operations of the process 500 can be implemented, for example, by the MPC system 130 of FIG. 1. Operations of the process 500 can also be implemented as instructions stored on one or more computer readable media which may be non-transitory, and execution of the instructions by one or more data processing apparatus can cause the one or more data processing apparatus to perform the operations of the process 500.

A first computing system of a multi-party computation (MPC) system 130 receives a query that includes a first share of a given user profile and a second share of the given user profile (502). For example, the application 107 generates two shares (for e.g., $[P_{i,\,1}]$, $[P_{i,\,2}]$) of the user profile, one for each computing system of the MPC system 130. The application 107 encrypts the first share $[P_{i,\,1}]$ using a public encryption key of the computing system MPC1 132. Similarly the application 107 encrypts the second share $[P_{i,\,2}]$ of the user profile using a public encryption key of the computing system MPC2 134. The application 107 executing on the client device 106 uploads the first encrypted shares (e.g., PubKeyEncrypt ($[P_{i,\,1}]$, MPC1)) and the second encrypted shares (e.g., PubKeyEncrypt ($[P_i,\,2]$, MPC2)) to the computing system MPC1 132.

The first computing system of the MPC system 130 transmits the second share to a second computing system of the MPC system 130 (504). For example, the application 107 executing on the client device 106 uploads the encrypted shares of user profiles to the computing system MPC1. The application 107 uploads the first share (e.g., PubKeyEncrypt ($[P_{i,\,1}]$, MPC1)) and the second share (e.g., PubKeyEncrypt ($[P_{i,\,2}]$, MPC2)) of user profile to MPC1. The computing system MPC1 decrypts the first share of user profile using the private key of the MPC1 and transmits the second share of the user profile to MPC2 (210). The MPC2 decrypts the second share of the user profile using the private key of MPC2.

The first computing system of the MPC system 130 determines a first label of a first cluster having a centroid that is closest to the first share (506). For example, after training the k-means machine learning model by MPC1 and MPC2, the application 107 transmits the query for user group label to computing system MPC1 132 that includes the first encrypted share and the second encrypted share of the user profile. In other examples, the application 107 can transmit the query for user group label to computing system MPC2 134. The application 107 can submit the query for user group label in response to a request from the content server to provide the label of the user group to which the application 107 is assigned to. For example, the content server can request the application 107 to query the k-means model to determine the user group label of the application 107 of the client device 110.

The MPC1 132 and MPC2 134 perform cryptographic protocol described in Step 212 of process 200 to generate a first bit vector based on the first share $[P_{i,1}]$ held confidentially by MPC1 and second share $[P_{i,2}]$ held confidentially by MPC2. In addition, the MPC1 132 and MPC2 134 perform cryptographic protocol to determine the first cluster and the first label.

The first computing system receives a response including a second label of the selected cluster (508). For example, the computing system MPC2 performs operations as mentioned in Step 212 of the process 200 and determines the cluster and the second label. After determining the second label, the computing system MPC2 134 can provide an encrypted version of the second label to the computing system MPC1, where the second label is encrypted using a public encryption key of the application 107.

The MPC system 130 responds to the query with a response that includes the first label and the second label (510). For example, the computing system MPC1 132 can provide, to the application 107, the first label of the selected cluster and the encrypted version of the second label of the selected cluster determined by the computing system MPC2. The application 107 can decrypt the second label of the second cluster that was determined by the computing system MPC2. After receiving the first label and the second label from the MPC system 130, the application can reconstruct the final label in cleartext based on the two secret shares received from the two servers in the MPC system 130 and stores the label on the client device 106.

Figure 6:
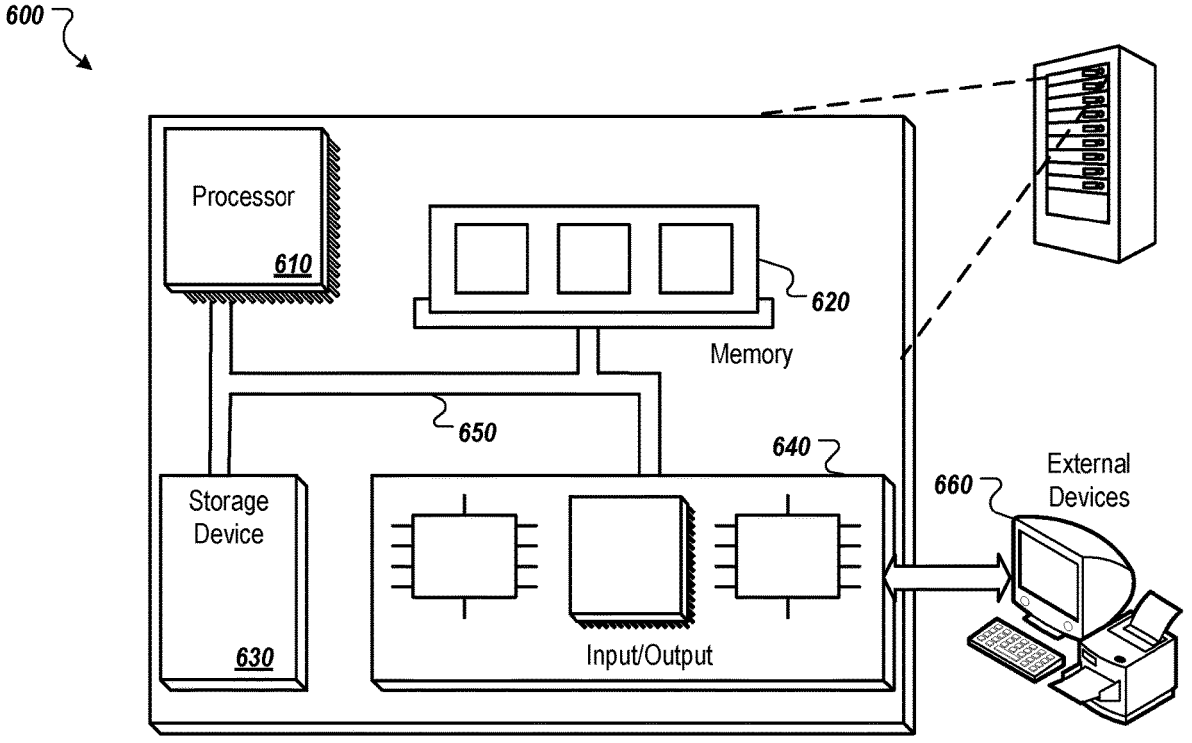
FIG. 6 is a block diagram of an example computer system.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In some implementations, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In some implementations, the memory 620 is a volatile memory unit. In another implementation, the memory 620 is a non-volatile memory unit.

The storage device 630 is capable of providing mass storage for the system 600. In some implementations, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In some implementations, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 660, e.g., keyboard, printer and display devices. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving, by a first computing system of a multi-party computation (MPC) system, a query that includes a first share of a given user profile and a second share of the given user profile, wherein the second share is encrypted with a key that prevents the first computing system from accessing the second share;
transmitting, by the first computing system, the second share to a second computing system of the MPC;
determining, by the first computing system, a first label of a first cluster having a centroid that is closest to the first share, wherein the first cluster is one of a plurality of clusters generated by a machine learning model trained by the first computing system and the second computing system;
receiving, by the first computing system, a response including a second label of a second cluster from the second computing system of the MPC;
responding to the query with a response that includes the first label and the second label.

2. The computer-implemented method of claim 1, further comprising:
receiving, by the first computing system, a first plurality of partial shares of user profiles from a digital component distribution system that differs from the MPC system;
receiving, by the second computing system, a second plurality of partial shares of user profiles from the digital component distribution system, wherein for an individual user, neither the first plurality of partial shares nor the second plurality of partial shares, wherein the first plurality of shares and the second plurality of shares are secret shares that includes all dimensions of the user profile of the individual user;
training, by the first computing system and the second computing system, the machine learning model using the first plurality of partial shares and the second plurality of partial shares.

3. The computer-implemented method of claim 2, wherein training the machine learning model comprises training a clustering model to create multiple clusters of user profiles based on the first plurality of partial shares and the second plurality of partial shares.

4. The computer-implemented method of claim 3, further comprising:
generating, by the MPC system, a centroid feature vector for each cluster from among the multiple clusters;
modelling, by the MPC system, each cluster using a probability distribution of the user profiles in the cluster;
generating, by the MPC system, a new centroid feature vector for each cluster based on the probability distribution and the centroid feature vector of the corresponding cluster;

sharing, by the MPC computing system, the new centroid feature vectors to the digital component distribution system.

5. The computer-implemented method of claim 1, further comprising:
splitting, by a client device, the given user profile into the first share and the second share;
generating and transmitting, to the first computing system, the query as a request for a label of a cluster that corresponds to the given user profile;
receiving, by the client device, the response that includes the first label and the second label;
storing, by the client device, device final label generated based on the first label and the second label.

6. The computer-implemented method of claim 5, wherein generating, by the client device, the final label comprises:
modelling, by the first and second computing system, the user profiles of the first and second clusters as a normal distributions;
determining, by the first and second computing system, the parameters of the normal distributions that comprises the centroid and the covariance matrix;
generating, by both the first and second computing system, a first and a second share of the final label;
transmitting, by the MPC system the first and the second share of the final label to the client device;
reconstructing, by the client device, the final label using the first and the second share of the final label.

7. The computer-implemented method of claim 5, wherein determining, by the first and second computing system, the covariance matrix comprises determining, by the first and second computing system, an integer matrix such that the matrix when multiplied by its transpose generates the covariance matrix.

8. A system, comprising:
receiving, by a first computing system of a multi-party computation (MPC) system, a query that includes a first share of a given user profile and a second share of the given user profile, wherein the second share is encrypted with a key that prevents the first computing system from accessing the second share;
transmitting, by the first computing system, the second share to a second computing system of the MPC;
determining, by the first computing system, a first label of a first cluster having a centroid that is closest to the first share, wherein the first cluster is one of a plurality of clusters generated by a machine learning model trained by the first computing system and the second computing system;
receiving, by the first computing system, a response including a second label of a second cluster from the second computing system of the MPC;
responding to the query with a response that includes the first label and the second label.

9. The system of claim 8, further comprising:
receiving, by the first computing system, a first plurality of partial shares of user profiles from a digital component distribution system that differs from the MPC system;
receiving, by the second computing system, a second plurality of partial shares of user profiles from the digital component distribution system, wherein for an individual user, neither the first plurality of partial shares nor the second plurality of partial shares, wherein the first plurality of shares and the second plurality of shares are secret shares that includes all dimensions of the user profile of the individual user;

training, by the first computing system and the second computing system, the machine learning model using the first plurality of partial shares and the second plurality of partial shares.

10. The system of claim 9, wherein training the machine learning model comprises training a clustering model to create multiple clusters of user profiles based on the first plurality of partial shares and the second plurality of partial shares.

11. The system of claim 10, further comprising:

generating, by the MPC system, a centroid feature vector for each cluster from among the multiple clusters;

modelling, by the MPC system, each cluster using a probability distribution of the user profiles in the cluster;

generating, by the MPC system, a new centroid feature vector for each cluster based on the probability distribution and the centroid feature vector of the corresponding cluster;

sharing, by the MPC computing system, the new centroid feature vectors to the digital component distribution system.

12. The system of claim 8, further comprising:

splitting, by a client device, the given user profile into the first share and the second share;

generating and transmitting, to the first computing system, the query as a request for a label of a cluster that corresponds to the given user profile;

receiving, by the client device, the response that includes the first label and the second label;

storing, by the client device, device final label generated based on the first label and the second label.

13. The system of claim 12, wherein generating, by the client device, the final label comprises:

modelling, by the first and second computing system, the user profiles of the first and second clusters as a normal distributions;

determining, by the first and second computing system, the parameters of the normal distributions that comprises the centroid and the covariance matrix;

generating, by both the first and second computing system, a first and a second share of the final label;

transmitting, by the MPC system the first and the second share of the final label to the client device;

reconstructing, by the client device, the final label using the first and the second share of the final label.

14. The system of claim 12, wherein determining, by the first and second computing system, the covariance matrix comprises determining, by the first and second computing system, an integer matrix such that the matrix when multiplied by its transpose generates the covariance matrix.

15. A non-transitory computer readable medium storing instructions that, when executed by one or more data processing apparatus, cause the one or more data processing apparatus to perform operations comprising:

receiving, by a first computing system of a multi-party computation (MPC) system, a query that includes a first share of a given user profile and a second share of the given user profile, wherein the second share is encrypted with a key that prevents the first computing system from accessing the second share;

transmitting, by the first computing system, the second share to a second computing system of the MPC;

determining, by the first computing system, a first label of a first cluster having a centroid that is closest to the first share, wherein the first cluster is one of a plurality of clusters generated by a machine learning model trained by the first computing system and the second computing system;

receiving, by the first computing system, a response including a second label of a second cluster from the second computing system of the MPC;

responding to the query with a response that includes the first label and the second label.

16. The non-transitory computer readable medium of claim 15, further comprising:

receiving, by the first computing system, a first plurality of partial shares of user profiles from a digital component distribution system that differs from the MPC system;

receiving, by the second computing system, a second plurality of partial shares of user profiles from the digital component distribution system, wherein for an individual user, neither the first plurality of partial shares nor the second plurality of partial shares, wherein the first plurality of shares and the second plurality of shares are secret shares that includes all dimensions of the user profile of the individual user;

training, by the first computing system and the second computing system, the machine learning model using the first plurality of partial shares and the second plurality of partial shares.

17. The non-transitory computer readable medium of claim 16, wherein training the machine learning model comprises training a clustering model to create multiple clusters of user profiles based on the first plurality of partial shares and the second plurality of partial shares.

18. The non-transitory computer readable medium of claim 17, further comprising:

generating, by the MPC system, a centroid feature vector for each cluster from among the multiple clusters;

modelling, by the MPC system, each cluster using a probability distribution of the user profiles in the cluster;

generating, by the MPC system, a new centroid feature vector for each cluster based on the probability distribution and the centroid feature vector of the corresponding cluster;

sharing, by the MPC computing system, the new centroid feature vectors to the digital component distribution system.

19. The non-transitory computer readable medium of claim 15, further comprising:

splitting, by a client device, the given user profile into the first share and the second share;

generating and transmitting, to the first computing system, the query as a request for a label of a cluster that corresponds to the given user profile;

receiving, by the client device, the response that includes the first label and the second label;

storing, by the client device, device final label generated based on the first label and the second label.

20. The non-transitory computer readable medium of claim 19, wherein generating, by the client device, the final label comprises:

modelling, by the first and second computing system, the user profiles of the first and second clusters as a normal distributions;

determining, by the first and second computing system, the parameters of the normal distributions that comprises the centroid and the covariance matrix;

generating, by both the first and second computing system, a first and a second share of the final label;

transmitting, by the MPC system the first and the second share of the final label to the client device;

reconstructing, by the client device, the final label using the first and the second share of the final label.

* * * * *